United States Patent [19]
Inbody

[11] 3,963,260
[45] June 15, 1976

[54] CENTERLINE STEERING WHEEL ASSEMBLY INCLUDING DISC BRAKE

[75] Inventor: Melvin R. Inbody, Findlay, Ohio

[73] Assignee: Diversified Interests, Inc., Findlay, Ohio

[22] Filed: July 29, 1974

[21] Appl. No.: 492,438

[52] U.S. Cl. .............................. 280/96.3; 188/18 A
[51] Int. Cl.² .......................................... B62D 7/08
[58] Field of Search ................ 280/96.3, 96.2, 96.1, 280/94; 188/18 A, 18 R

[56] References Cited
UNITED STATES PATENTS

| | | | |
|---|---|---|---|
| 2,044,490 | 6/1936 | Zook | 280/96.3 X |
| 2,410,557 | 11/1946 | Watson | 280/96.3 X |
| 2,785,907 | 3/1957 | Hutchens et al. | 280/96.3 |
| 2,987,322 | 6/1961 | Hutchens | 280/96.3 |
| 2,989,153 | 6/1961 | Boulet | 188/18 A X |
| 2,997,312 | 8/1961 | Müller et al. | 188/18 A X |
| 3,332,518 | 7/1967 | North et al. | 280/96.2 R |
| 3,727,938 | 4/1973 | Goodbary | 280/96.2 R |
| 3,756,352 | 9/1973 | Urban | 280/96.3 X |
| 3,758,129 | 9/1973 | Ishikawa | 188/18 A X |

*Primary Examiner*—M. H. Wood, Jr.
*Assistant Examiner*—John P. Silverstrim
*Attorney, Agent, or Firm*—Laverne D. Geiger

[57] ABSTRACT

A dirigible wheel of an automotive vehicle has its steering axis on the vertical center line of the wheel, and a brake disc is supported with annular braking surfaces in vertical planes adjacent the center line and are engaged by caliper type brake shoes.

6 Claims, 2 Drawing Figures

CENTERLINE STEERING WHEEL ASSEMBLY INCLUDING DISC BRAKE

BACKGROUND OF THE INVENTION

It is desirable to provide automotive vehicles with disc type brakes which comprise a flat disc-like rotor attached to the vehicle wheel and having a pair of hydraulically actuated brake shoes which clamp a segment of the rotor thereto for applying a braking action to the wheel. Difficulties have been encountered with brakes of this type when applied to the dirigible wheels of vehicles because out of balance condition of the wheels cause vibrations of the rotors and the brake shoe actuating mechanisms resulting in noise and deterioration of the hydraulic shoe actuating mechanisms.

THE INVENTION

The principal object of the present invention is the provision of a new and improved disc type brake mechanism for the dirigible wheels of all surface vehicles in which the steering axis of each wheel substantially coincides with the plane of the disc brake rotor on the respective wheels.

Figure 1:
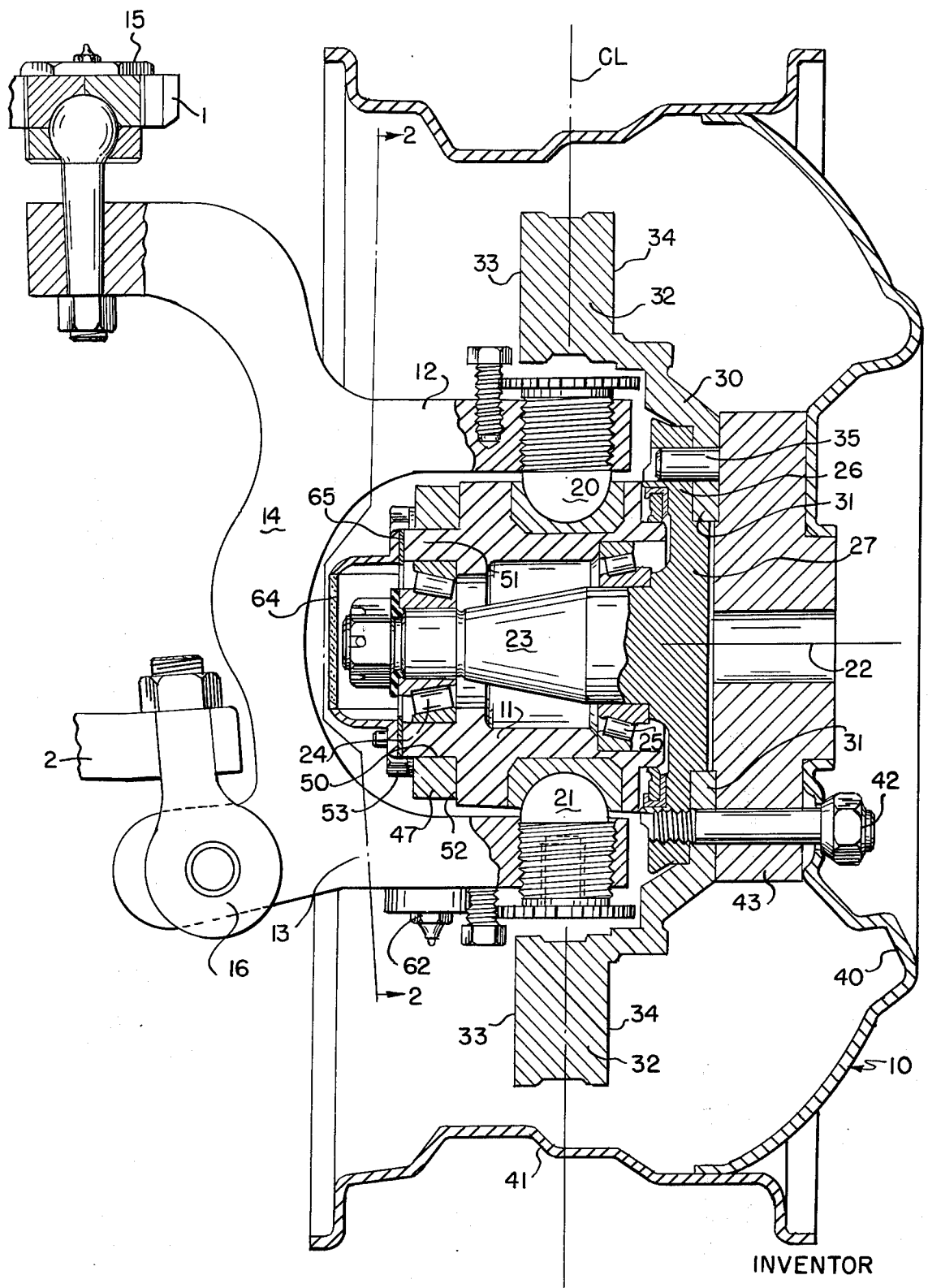
Figure 2:
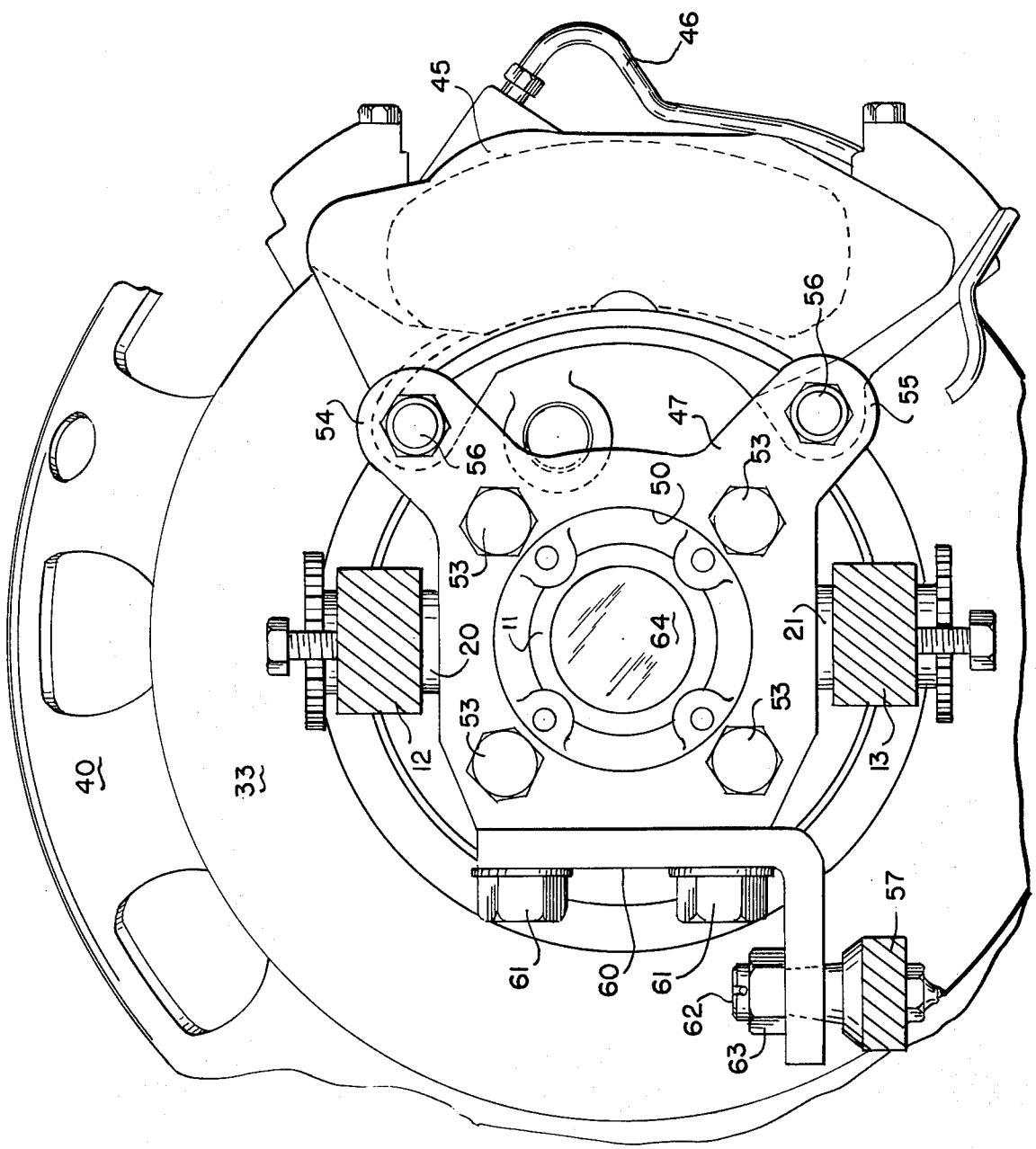

Other objects and advantages of the invention will be apparent from the following description of a preferred form thereof, reference being made to the accompanying drawings wherein:

FIG. 1 is a sectional view of a front wheel assembly of a surface vehicle, the section being taken on a vertical plane through the center of the wheel and transversely thereof; and FIG. 2 is a fragmentary sectional view taken substantially along line 2—2 of FIG. 1.

Referring to the drawings, one wheel 10 of the two front wheels of a surface vehicle is shown. It is to be understood that the other wheel is identical in construction to the wheel 10 and to avoid repetition it is not shown. The wheel 10 is a dirigible wheel and is the type in which the vertical axis about which the wheel is rotated to effect steering of a surface vehicle is coincident with the vertical center line of the wheel. This center line is indicated by the broken line CL. The details of the manner in which the wheel 10 is supported for the steering movement described are fully disclosed in U.S. Pat. No. 2,987,322. Suffice to say, the wheel 10 comprises a hub 11 which is supported between two arms 12,13 of a yoke member 14. The yoke member 14 is connected to upper and lower ends of a conventional A frame structure 1,2 on the axle of the surface vehicle, not shown, by a ball socket joint 15 and a hinge joint 16. The hinge joint 16 is constructed to prevent rotation of the yoke member 14 about a vertical axis while allowing vertical movements about a horizontal axis. The ball joint 15 provides universal movement between the A frame and the yoke member.

The wheel hub 11 is supported on the yoke member by two bearings 20,21 which are vertically aligned and which provide means for turning the hub about a vertical axis which is normal to the axis of rotation of the wheel which is on the center line of the hub as indicated at 22.

The wheel 10 includes a spindle 23 which is supported for rotation in the hub 11 by bearings 24,25. One end of the spindle 23 projects from the hub 11 and has an annular flange 26 extending radially from a circular central boss 27.

An annular brake shoe member 30 has an annular central portion 31 which is centered about the boss 27 and lies against the flange 26. The shoe member 30 includes an annular brake rotor portion 32 which is offset from the plane of the central portion 31 so that the rotor presents disc brake surfaces 33,34 lying in vertical planes equally spaced from the center line CL. A dowel pin 35 extending through openings through the flange 26 and shoe member 30 properly aligns the rotor and spindle when the wheel is assembled.

The wheel proper includes an annular radial wheel member 40 having a conventional tire rim 41 secured thereto about its periphery. The inner edge portion of the radial member 40 is bolted to the spindle flange 26 by bolts, one of which is seen at 42. An annular spacer member 43 is interposed between the wheel member 40 and the rotor portion 32. The thickness of the spacer member 43 is such that the tire rim 41 is bisected by the vertical plane containing the axis of rotation of the hub 11 about the bearings 20,21.

The disc brake surfaces 33,34 are adapted to be engaged by brake shoes of a conventional brake caliper assembly 45. Brake caliper assemblies like that shown are well known in the art and details thereof are not described herein. The assembly straddles the rotor portion 32 and presses brake shoes to the disc surfaces 33,34 in response to the application of fluid pressure by way of suitable conduits 46. The brake caliper assembly 45 is supported in operative relation to the brake disc by a bracket 47. The bracket 47 is in the form of a plate having a central opening 50 which closely receives a cylindrical neck portion 51 of the hub 11, and the bracket is bolted to an annular shoulder 52 at the inner end of the neck portion by a bolt 53. The bracket 47 has arms 54,55 to which the brake caliper assembly 45 is attached by bolts 56.

The bracket 47 also serves to connect the steering tie rod 57 to the hub 11. For this purpose an L-shape tie rod arm 60 is attached to the end of the bracket 47 opposite the end supporting the brake caliper assembly 45 by bolts 61. The tie rod is attached to a laterally projecting portion of the tie rod arm 60 by a stud 62 extending through an opening in the arm and received by a nut 63.

In practice, radially extending annular shields, not shown, may be attached to the yoke member 14 and wheel assembly to prevent water and dirt from being thrown onto the brake surfaces 33,34.

The hub 11 contains oil for lubricating the bearings 24,25. The oil is retained in the hub by an end cap 64 bolted to one end of the hub. An oil sealing ring 65 is interposed between the inner surface of the spindle flange 26 and the end portion at the other end of the hub.

By arranging the brake shoe engaging surfaces of the brake disc substantially in vertical planes equally spaced from the center line of the steering axis of the wheel and having this center line coincident with the vertical center line of the wheel rim, deleterious vibrations of the brake disc are avoided thereby providing reliable, smooth acting braking of the wheel.

I claim:

1. A dirigible wheel assembly for a surface vehicle having an axle, an A frame on said axle and a steering tie rod, said assembly comprising: A hub; a wheel spindle journalled in said hub, said spindle including a circular central boss projecting from said hub, and an annular flange extending radially from said boss; a wheel member connected to said annular flange; a yoke member having parallel arms extending above and below said hub; bearing means supporting said hub on said arms for turning movement about a vertical steering axis lying in a plane normal to the center line of said hub and coincident with the vertical center line of said wheel member; an annular brake shoe member attached to said flange, said brake shoe member having an annular brake rotor presenting annular disc brake surfaces lying in vertical planes substantially equally spaced from said center line; a brake caliper assembly straddling said brake rotor, and having brake shoes for pressing against said disc brake surfaces; means for supporting said caliper assembly on said hub; means for connecting said tie rod to said means for supporting said caliper assembly; a ball-socket joint connecting said yoke to the upper end of said A frame; and a hinge joint connecting said yoke to the lower end of said A frame.

2. A dirigible wheel assembly as defined in claim 1 wherein said wheel member includes a tire rim whose sides are equally spaced from the center line of the wheel member and wherein said brake shoe member and said wheel member are attached to the annular flange of the spindle by common attaching means.

3. A dirigible wheel assembly as defined in claim 1 wherein said hub has a cylindical neck portion and an annular shoulder at the inner end of the neck portion and wherein said support means for supporting said brake caliper assembly comprises a bracket having a plate with a central opening which closely receives said neck portion and which is attached to the annular shoulder and having arms attached to the brake caliper, and an L-shape tie rod arm attached to the end of said bracket and having a laterally projecting portion for attaching to said vehicle steering tie rod.

4. A dirigible wheel assembly as defined in claim 1 wherein said brake disc, said brake caliper assembly, said bracket, said tie rod arm, said hub and said spindle are entirely inside the wheel member within planes extending through the side edges of said wheel rim.

5. A dirigible wheel assembly for a surface vehicle, comprising a wheel member, a hub, a wheel spindle journalled in said hub and having a circular central boss projecting from the hub and an annular flange extending radially from the boss, means suporting said hub for turning movement about a steering axis lying in a plane normal to the axis of rotation of said spindle and comprising a yoke member having parallel arms extending above and below said hub, bearing means between said arms and said hub and forming a pivot for swinging said hub about said steering axis, said wheel member being attached to said annular flange by an attaching menber, said wheel member including a tire rim the sides of which are equally spaced from said plane, an annular brake disc attached to said annular flange by said attaching member and presenting annular brake shoe engaging surfaces lying in planes normal to the axis of rotation of said spindle and substantially equally spaced from said first mentioned plane, said hub having a neck portion and a shoulder at the inner end of the neck portion facing said yoke member, a bracket having a central opening closely receiving said neck portion and secured to said shoulder and having arms, a brake caliper assembly attached to said arms, said brake caliper assembly including brake shoes on both sides of said brake disc for pressing against said respective brake shoe engaging surfaces and an L-shape tie rod arm attached to said bracket opposite said arms.

6. A dirigible wheel assembly as defined in claim 5 wherein said brake disc, said brake caliper assembly, said bracket, said tie rod arm, said hub and said spindle are entirely inside the wheel member within planes extending through the side edges of said wheel rim.

* * * * *